United States Patent [19]

Brasseur

[11] Patent Number: 4,556,838
[45] Date of Patent: Dec. 3, 1985

[54] ELECTRONIC SWITCH

[75] Inventor: Georg Brasseur, Vienna, Austria

[73] Assignee: Friedmann & Maier Aktiengesellschaft, Hallein, Austria

[21] Appl. No.: 538,950

[22] Filed: Oct. 4, 1983

[30] Foreign Application Priority Data

Oct. 4, 1982 [AT] Austria ................................. 3668/82

[51] Int. Cl.$^4$ ............................................. G05F 1/56
[52] U.S. Cl. ..................................... 323/285; 323/299
[58] Field of Search ............... 323/284, 285, 299, 267, 323/269, 271, 272, 273

[56] References Cited

U.S. PATENT DOCUMENTS 4,221,979 9/1980 Ahmed ................. 323/313

FOREIGN PATENT DOCUMENTS 0681423 8/1979 U.S.S.R. ............................. 323/285
0824168 4/1981 U.S.S.R. ............................. 323/299

Primary Examiner—Peter S. Wong
Assistant Examiner—Judson H. Jones
Attorney, Agent, or Firm—Cushman, Darby & Cushman

[57] ABSTRACT

An electronic switch with two transistors connected in a Darlington configuration. A first of the two transistors has collector-emitter terminals connected between input and output terminals. A regulator monitors the output voltage and controls the duty cycle of a switch providing base drive current to the second transistor of the Darlington pair. Current from the switch is also provided to a second switch which is connected to the base of the first transistor. The second switch is a comparator which monitors the voltage of the input terminal as compared to a reference. When the difference between the voltages at the input and output terminals is low, the second switch is closed so that the first transistor is driven by the current through the first switch directly. When the difference between the input voltage and output voltage is high, the second switch opens so that the two transistors are operative as a Darlington pair. The electronic switch in the preferred embodiment is employed in a switching regulator.

17 Claims, 1 Drawing Figure

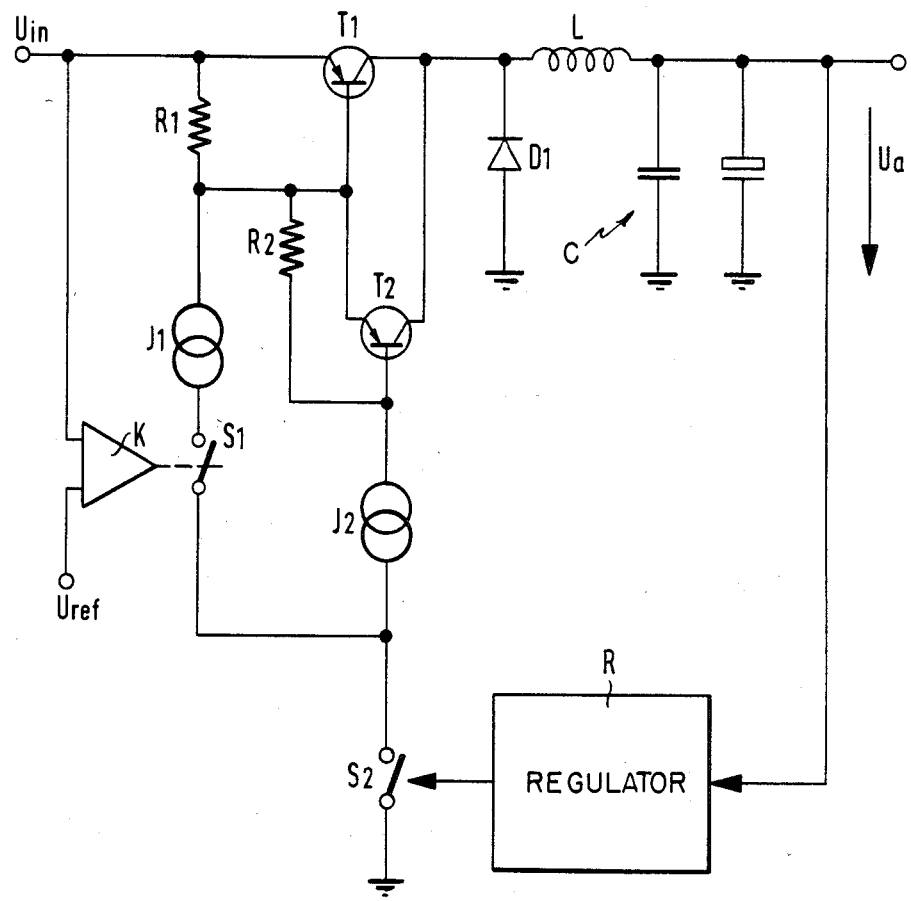

ELECTRONIC SWITCH

BACKGROUND OF THE INVENTION

1. Field of the Invention

This invention relates to an electronic switch, especially to a switching circuit in a network for switching potentials which are different from the potentials in the switching circuit.

2. Description of the Prior Art

Such switching circuits include in most cases, a simple transistor which connects the potential of a voltage source which is different from the potential with an inductive and/or a capacitive load circuit. The transistor is triggered, in most instances, by a rectangular oscillator with variable duty cycle controlled in accordance with the input voltage source or the voltage across the load circuit.

A disadvantage exists with this conventional circuit in that losses in performance develop as a result of the triggering, generating heat.

SUMMARY OF THE INVENTION

It is the goal of the invention to propose an electronic switch which, in view of losses therein, automatically adapts to the existing conditions and which is effective whether the difference between the input and output voltages is large or small. According to the invention, this is achieved with two transistors disposed in a Darlington configuration. The transistor whose emitter-collector is connected across the input and output voltage can receive drive current for its base either from the emitter-collector of the second transistor, or, by way of a switch, from a current source connected to a switch controlled by a regulator. A current path possibly having another current source, is connected to the base of the second transistor.

In this manner, it is possible to selectively operate the switching transistor of the electronic switch, depending on conditions, by the Darlington connection or by direct triggering. Thus, when the difference between the input and the output voltages is slight, the base of the switching transistor is provided current by way of the current path controlled by the switch. As a result, the second transistor of the Darlington connection becomes ineffective. Since the saturation voltage across the emitter-collector of the switching transistor is slight, only small losses, dependent on the load current result. Even when the saturation voltage is slight and difference between the input and output voltages is also slight for example, 0.5 V, perfect operation of the switch is still ensured.

It is true that larger losses develop when only one transistor is employed with the difference between the input and the output voltages being great. In this situation in the present invention the two transistors may be operated in a Darlington configuration, so that the losses in the triggering decrease drastically, although the losses depending on the load current rise with an increasing voltage drop across the two transistors.

According to a further characteristic of the invention, the switch which connects the current path connected to the base of the switching transistor is controlled by a comparator which compares the input voltage of the electronic switch with a reference circuit. Thus, it is possible to achieve in a simple manner automatic switching between operating states in dependence on the input voltage. As a result of a corresponding fixation of the reference voltage, an optimal adaptation to the pertinent conditions is possible in view of the loss-performance balance.

BRIEF DESCRIPTION OF THE DRAWING

These and other objects and advantages will become more apparent and more readily appreciated from the following detailed description of the presently preferred exemplary embodiment of the present invention taken in conjunction with the accompanying drawing which shows a switch according to the present invention.

DETAILED DESCRIPTION OF THE PRESENTLY PREFERRED EXEMPLARY EMBODIMENT

Two transistors T1 and T2 are connected in a Darlington configuration with the input and output voltages appearing at the terminals of transistor T1. The base of transistor T1 is connected both to the emitter of transistor T2, and with a current path having a current source J1 and a switch S1. Current source J1 may possibly include a resistance. This current path may selectively supply transistor T1 with base current when switch S1 is closed.

Switch S1 is controlled by a comparator K which compares the input voltage $U_{in}$ with a reference voltage $U_{ref}$ and which closes switch S1 whenever the input voltage is below the reference voltage.

Switch S1 is connected to control switch S2 and the current path which provides base current for transistor T2, which path likewise has a current source J2 which may also be constituted by a resistance. Control switch S2 is controlled by a regulator R which regulates the duty cycle of operation of control switch S2 in dependence on the output voltage Ua in order to keep the output voltage constant at a predetermined value.

With the electronic switch including two transistors T1 and T2, in the embodiment shown by way of example, a diode D1, inductance L and condenser C are connected between the transistor T1 and the output terminal to which regulator R is connected.

In parallel to the emitter-base terminals of transistors T1 and T2, in the embodiment shown by way of example, resistances R1 and R2 are connected which, however, are not absolutely required.

Whenever input voltage $U_{in}$ is smaller than reference voltage $U_{ref}$, then switch S1 is closed. Whenever now, control switch S2 is also closed, then the base of transistor T1 is supplied with base current through control switch S2, switch S1, and current source J1 so that transistor T1 becomes conductive. Transistor T2, in this case, despite receiving base current through control switch S2 and current source J2, is functionless.

At the same time losses occur in transistor T1 related to the product of the load current and the emitter-collector voltage drop. Typically the voltage drop across the emitter-collector is approximately 0.3–0.4 V, whenever transistor T1 is driven into saturation.

Furthermore, losses develop in the triggering of the two transistors. These driver losses are related to the product of the input voltage and the sum of the base currents of transistors T1 and T2. The base current of transistor T2 is smaller than the base current of transistor T1 by the gain of transistor T2 and is thus practically negligible.

Whenever the input voltage exceeds the reference voltage, then switch S1 remains opened. In this condition, control switch S2 closes in accordance with regulator R. Transistors T1 and T2 are thereby operated in a Darlington configuration and only transistor T2 is supplied with base current from a current source. At the same time only slight driver losses develop due to the high gain of this arrangement which is equal to the product of the gains of both transistors. It is true that across transistors T1 and T2 a high voltage drop develops so that the losses, dependent on the load current, are increased as compared to the previously described operating state. This voltage drop includes the sum of the emitter-base voltage drop of transistor T1 which is about 0.7 V and the emitter-collector voltage drop when transistor T2 is saturated which is about 0.3–0.4 V so that the total voltage drop between the emitter of transistor T1 and the collector of transistor T2 is about 1 V.

Thus, the total losses may be optimized by appropriately selecting the reference voltage. Moreover, as a result of the changeover of the operating state of the electronic switch, the switch may be used whether a slight difference or a large difference exists between the input and the output voltages.

What is claimed is:

1. An electronic switch comprising:
   a first semiconductor element having power terminals, coupled between input and output terminals, and a control terminal;
   a second semiconductor element, having power terminals and a control terminal and connected in Darlington configuration with said first semiconductor element;
   first applying means, coupled to said output terminal, for applying a regulating signal to said control terminal of said second semiconductor element; and
   second applying means for selectively applying said regulating signal to said control terminal of said first semiconductor element.

2. A switch as in claim 1 wherein said first applying means comprises:
   a current source; and
   means, responsive to a control signal, for selectively causing current to flow from said current source into said control terminal of said second semiconductor element.

3. A switch as in claim 2 wherein said second applying means comprises:
   another current source coupled to said regulating signal; and
   means, responsive to another control signal, for selectively causing current to flow from said another current source into said control terminal of said first semiconductor element.

4. A switch as in claim 3 wherein said second applying means further comprises comparing means for producing said another control signal in response to a comparison between a voltage at said input terminal and a reference voltage.

5. A switch as in claim 1 wherein said second applying means comprises:
   means for comparing a voltage at said input terminal and with a reference terminal;
   switch means, responsive to said comparing means, for applying said regulating signal to said first semiconductor element control terminal.

6. A switch as in claim 1 further comprising:
   an inductor having a first terminal connected to said first semiconductor element and a second terminal connected to said output terminal;
   a diode having a cathode connected to said first terminal of said inductor; and
   a condenser connected to said second terminal of said inductor.

7. A voltage regulator comprising:
   a first semiconductor element having power terminals coupled between input and output terminals and a control terminal;
   a second semiconductor element, having power terminals and a control terminal, and connected in Darlington configuration with said first semiconductor element;
   means, coupled to said output terminal, for generating a regulator signal applied to said control terminal of said second semiconductor element;
   means for comparing a voltage at said input terminal with a reference voltage;
   means, responsive to said comparing means, for selectively applying said regulating signal to said first semiconductor element control terminal;
   an inductor connected between said first semiconductor element and said output terminal;
   a diode having a cathode connected to a terminal of said inductor; and
   a condenser connected to another terminal of said inductor.

8. An electronic switch for selectively connecting an input terminal to a load, comprising:
   a first switching transistor including an emitter, a collector and a base, the emitter thereof connected to an input terminal, the collector thereof connected to a load, said first transistor selectively connecting said input terminal to said load in response to current applied to the base thereof;
   a second transistor including an emitter, a collector and a base, the emitter thereof connected to the base of said first transistor and the collector thereof connected to the collector of said first transistor; and
   controlling means for applying current to the base of said second transistor in response to a control signal and for selectively applying current directly to the base of said first transistor in response to both the level of a signal present on said input terminal and said control signal.

9. A switch as in claim 8 further including means for selectively producing said control signal in response to the level of a signal present at the load.

10. A switch as in claim 8 wherein controlling means includes:
    first current source means for producing a first current; and
    switching means for selectively connecting said first current to the base of said first transistor in response to the signal level present on said input terminal.

11. A switch as in claim 10 further comprising regulating means for regulating the current applied to the bases of each of said first and second transistors in response to the level of a signal present at said load.

12. A switch as claim 10 wherein:
    said switching means includes:

comparing means for comparing the level of a signal present on said input terminal to a reference level, and a first switch, operatively connected to said comparing means, for selectively applying said first current to the base of said first transistor in response to the results of the comparison performed by said comparing means; and said controlling means further includes:

second source means for producing a second current, and another switching means, operatively connected to said first and second current source means, for varying the duty cycle of the first current applied to the base of said first transistor and for varying the duty cycle of said second current applied to the base of said second transistor.

13. A switch as in claim 12 wherein:

said comparing means produces a switching control signal when the level of the signal present on said input terminal is less than said reference level; and said first switch connects said first current to the base of said first transistor in response to said switching control signal.

14. A switch as in claim 8 wherein said controlling means includes:

current source means for producing a current;

comparing means for comparing the level of a signal present on said input terminal to a reference level; and switching means, operatively connected to said comparing means, for selectively applying said current produced by said current source means to the base of said first transistor in response to the results of the comparison performed by said comparing means.

15. A switch as in claim 14 wherein:

said comparing means produces a switching control signal when the level of the signal present on said input terminal is less than said reference level; and said switching means connects said current produced by said current source means to the base of first transistor in response to said switching control signal.

16. A voltage regulator for selectively connecting an input voltage $U_{in}$ to a load, comprising:

a first switching transistor including first and second switching terminals and a control terminal, said first switching terminal connected to the input voltage $U_{in}$, the second switching terminal connected to the load, said first transistor selectively passing the input voltage $U_{in}$ to the load in response to current applied to the control input thereof;

a second transistor including first and second switching terminals and a control terminal, the first switching terminal thereof connected to the control terminal of said first transistor, the second switching terminal thereof connected to the second switching terminal of said first transistor;

means for producing a regulating control signal in response to the voltage level present at the load; and controlling means for applying current to the control terminal of said second transistor in response to said regulating control signal and for selectively applying current directly to the control terminal of said first transistor in response to both said regulating control signal and to the amplitude of the input voltage $U_{in}$.

17. A voltage regulator as in claim 6 wherein said controlling means includes:

a first current source having first and second terminals, the first terminal of said first current source being connected to the control terminal of said first transistor;

a second current source having first and second terminals, the fist terminal of said second current source being connected to the control terminal of said second transistor;

comparing means producing a switching control signal whenever the level of the input voltage $U_{in}$ is less than a reference level;

first switching means, connected between said second current source second terminal and ground potential, for selectively permitting current to flow therethrough in response to said regulating signal; and second switching means, connected between said first current source second terminal and said second current source second terminal and operatively coupled to said comparing means, for permitting current to flow therethrough in response to said switching control signal.

* * * * *